United States Patent Office 3,592,807
Patented July 13, 1971

3,592,807
WATER-INSOLUBLE (N - CYANOLOWERALKYL-N-ACYLOXYLOWERALKYLAMINO) - PHENYLAZO-BENZENE DYESTUFFS
Hanswilli von Brachel, Offenbach (Main), Dieter Cornelius, Seeheim, and Otto Gräwinger, Frankfurt am Main, Fechenheim, Germany, assignors to Cassella Farbwerke Mainkur Aktiengesellschaft, Frankfurt am Main, Fechenheim, Germany
No Drawing. Filed Dec. 14, 1965, Ser. No. 513,828
Claims priority, application Germany, Dec. 24, 1964, C 34,750
Int. Cl. C07c *107/00;* C09b *29/08;* D06p *1/06*
U.S. Cl. 260—207.1       3 Claims

ABSTRACT OF THE DISCLOSURE

This invention relates to water-insoluble monoazo dyestuffs having a diazo coupled N-cyano-lower-alkyl, N-acyloxy-lower-alkyl aniline structure, which dyestuffs dye or print natural and synthetic fibers with good fastness properties.

---

The water-insoluble dyestuffs of the present invention correspond to the following formula

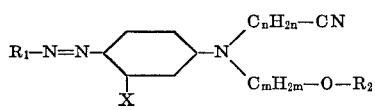

wherein $R_1$ stands for an aromatic radical selected from the group consisting of cyanophenyl, nitrophenyl, dicyanophenyl, dinitrophenyl, halogenocyanophenyl, halogenonitrophenyl, cyanonitrophenyl, halogenodicyanophenyl, halogenodinitrophenyl, halogenonitrocyanophenyl, dihalogenocyanophenyl, dihalogenotolyl, dihalogenonitrophenyl, and nitrothiazolyl, X stands for a member selected from the group consisting of hydrogen, bromine, chlorine, and lower alkyl, $n$ and $m$ are 2 or 3, $R_2$ stands for an acyl radical selected from the group consisting of phenoxyacetyl, lower β-alkoxy-propionyl, lower γ-alkoxybutyryl, and lower β-alkoxyisobutyryl.

These dyestuffs are obtained by (a) coupling 1 mol of the diazo compound of an amine free from water-solubilising groups having the formula $R_1NH_2$ with 1 mol of a tertiary amine having the formula

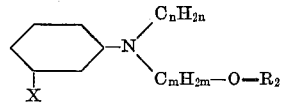

or (b) esterifying 1 mol of a monoazo dyestuff of the formula

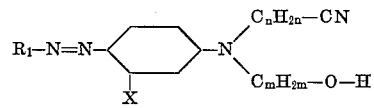

with 1 mol of a carboxylic acid having the formula $$R_2\text{—OH}$$

or of a functional derivative thereof.

The dyestuffs of the present invention are suited for the dyeing and printing of textile materials made from natural and synthetic fibres, based on cellulose esters, synthetic polyamides, terephthalic acid esters and polyacrylonitrile. When applied onto these materials, they yield dyeings and prints that distinguish themselves by very good fastness properties. Moreover, the dyestuffs are partly suited as pigment dyestuffs for the dyeing of, for example, lacquers and plastics in the mass or as spin-dyes for synthetic fibers.

The following examples will further illustrate how our present invention may be carried out in practice, but the invention is not restricted to these examples.

EXAMPLE 1

37.3 g. (=9.1 mol) 2,4-dichloro-5-methyl-[4'(N-cyanoethyl-N-hydroxyethyl-amino)-phenylazo]-benzene are dissolved in the heat, in 500 cc. ethylene chloride, and the resulting solution admixed with 18 g. (=0.11 mol) butoxy-propionic acid chloride and heated until no more hydrochloric acid escapes and a sample taken is of a chromatographic uniformity. The solution is then reduced to a small volume, the reaction product is precipitated with alcohol, filtered off with suction, washed, and dried.

Yield: 41 g. of a yellow dyestuff powder that dyes polyester fibers yellow shades.

EXAMPLE 2

The dyestuffs as given in the table below may be prepared in the following manner:

0.1 mol of the diazo component are diazotized in the usual manner and added to a cold solution of 0.1 mol of the coupling component in 2 N-hydrochloric acid. Thereafter, sodium acetate is added until the mineral acid is neutralized and the dyestuff thus obtained is then isolated in the usual manner.

| Diazo component | Coupling component | Shade of the dyeings on fibres based on polyethylene-glycol-terephthalate |
|---|---|---|
| 2,4-dichloro-5-methyl-aniline | Butoxy-propionic acid ester of N-cyano-ethyl-N-hydroxyl-ethyl-aniline. | Yellow. |
| 4-nitro-aniline | do | Orange. |
| 2-chloro-4-nitro-aniline | do | Brown-red. |
| 2-amino-5-nitro-thiazole | do | Red-violet. |
| 2,4-dichloro-5-methyl-aniline | Phenoxy-acetic acid ester of N-cyano-ethyl-N-hydroxy-ethyl-aniline. | Yellow. |
| 4-nitro-aniline | do | Orange. |
| 2-chloro-4-nitro-aniline | do | Brown-red. |
| 2-amino-5-nitro-thiazole | do | Red-violet. |
| 2,4-dichloro-5-methyl-aniline | β-Methoxy-isobutyric acid ester of N-cyano-ethyl-N-hydroxy-ethyl-aniline. | Yellow. |
| 4-nitro-aniline | do | Orange. |
| 2-chloro-4-nitro-aniline | do | Brown-red. |
| 2-amino-5-nitro-thiazole | do | Red-violet. |
| 4-cyano-aniline | Phenoxy-acetic acid ester of N-cyano-ethyl-N-hydroxy-ethyl-aniline. | Orange. |

| Diazo component | Coupling component | Shade of the dyeings on fibres based on polyethylene-glycol-terephthalate |
|---|---|---|
| 2,4-dicyano-aniline | do | Red. |
| 2,4-dinitro-aniline | do | Red. |
| 2-bromo-4-nitro-aniline | do | Red. |
| 2-chloro-4-cyano-aniline | do | Red. |
| 2-cyano-4-nitro-aniline | do | Red. |
| 2,4-dinitro-6-bromo-aniline | do | Red. |
| 2,4-dicyano-6-chloro-aniline | do | Red. |
| 2-cyano-4-nitro-6-bromo-aniline | do | Red. |
| 2,6-dichloro-4-nitro-aniline | do | Brown |
| 2-chloro-4-nitro-6-bromo-aniline | do | Do. |
| 2,6-dichloro-4-cyano-aniline | do | Do. |
| 4-nitro-aniline | Phenoxy-acetic acid ester of N-cyano-ethyl-N-hydroxyethyl-m-toluidine. | Orange. |
| 2-cyano-4-nitro-aniline | do | Red. |
| 2,6-dichloro-4-nitro-aniline | do | Brown. |
| 5-nitro-2-amino-thiazole | do | Violet. |
| 2-bromo-4-nitro-aniline | Phenoxy-acetic acid ester of N-cyano-propyl-N-hydroxyethyl-aniline. | Red. |
| 2,4-dinitro-6-bromo-aniline | do | Bordeaux. |
| 2,6-dibromo-4-nitro-aniline | do | Brown. |
| 4-nitro-aniline | Phenoxy-acetic acid ester of N-cyano-ethyl-N-hydroxypropyl-aniline. | Orange. |
| 2-chloro-4-nitro-aniline | do | Red. |
| 2,4-dinitro-6-bromo-aniline | do | Bordeaux. |
| 2,6-dichloro-4-cyano-aniline | do | Brown. |
| 2-amino-5-nitro-thiazole | do | Red-violet. |
| 4-cyano-aniline | β-Butoxy-propionic acid ester of N-cyano-ethyl-N-hydroxyethyl-aniline. | Orange. |
| 2,4-dicyano-aniline | do | Red. |
| 2,4-dinitro-aniline | do | Red. |
| 2-bromo-4-nitro-aniline | do | Red. |
| 2-chloro-4-cyano-aniline | do | Red. |
| 2-cyano-4-nitro-aniline | do | Red. |
| 2,4-dinitro-6-bromo-aniline | do | Red. |
| 2,4-dicyano-6-chloro-aniline | do | Red. |
| 2-cyano-4-nitro-6-bromo-aniline | do | Red. |
| 2,6-dichloro-4-nitro-aniline | do | Brown. |
| 2-chloro-4-nitro-6-bromo-aniline | do | Do. |
| 2,6-dichloro-4-cyano-aniline | do | Do. |
| 4-nitro-aniline | β-Butoxy-propionic acid ester of N-cyano-ethyl-N-hydroxyethyl-m-chloro-aniline. | Orange. |
| 2-chloro-4-nitro-aniline | do | Red. |
| 2,6-dichloro-4-nitro-aniline | do | Brown. |
| 2-amino-5-nitro-thiazole | do | Violet. |
| 2,4-dichloro-4-methyl-aniline | γ-Ethoxy-butyric acid ester of N-cyano-ethyl-N-hydroxyethyl-aniline. | Yellow. |
| 4-nitro-aniline | do | Orange. |
| 4-cyano-aniline | do | Do. |
| 2,4-dinitro-aniline | do | Red. |
| 2,4-dicyano-aniline | do | Red. |
| 2-chloro-4-nitro-aniline | do | Red. |
| 2-cyano-4-nitro-aniline | do | Red. |
| 2,4-dinitro-6-bromo-aniline | do | Red. |
| 2,4-dicyano-6-chloro-aniline | do | Red. |
| 2-cyano-4-nitro-6-bromo-aniline | do | Red. |
| 2,6-dichloro-4-nitro-aniline | do | Brown. |
| 2,6-dichloro-4-cyano-aniline | do | Do. |
| 2-amino-5-nitro-thiazole | do | Violet. |
| 4-cyano-aniline | β-Methoxy-isobutyric acid ester of N-cyano-ethyl-N-hydroxyethyl-aniline. | Orange. |
| 2,4-dinitro-aniline | do | Red. |
| 2,4-dicyano-aniline | do | Red. |
| 2-cyano-4-nitro-aniline | do | Red. |
| 2,4-dinitro-6-bromo-aniline | do | Red. |
| 2,4-dicyano-6-chloro-aniline | do | Red. |
| 2-cyano-4-nitro-6-bromo-aniline | do | Red. |
| 2,6-dichloro-4-nitro-aniline | do | Brown. |
| 2,6-dichloro-4-cyano-aniline | do | Do. |

The dyestuffs can also be prepared in analogy to Example 1 by esterifying the corresponding N-hydroxyalkyl compounds with the respective ether carboxylic acid.

It will be understood that this invention is susceptible to further modification and accordingly, it is desired to comprehend such modifications within this invention as may fall within the scope of the appended claims.

We claim:

1. A water-insoluble monoazo dyestuff which corresponds to the formula

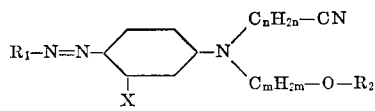

wherein
$R_1$ stands for an aromatic radical selected from the group consisting of cyanophenyl, nitrophenyl, dicyanophenyl, dinitrophenyl, halogenocyanophenyl, halogenonitrophenyl, cyanonitrophenyl, halogenodicyanophenyl, halogenodinitrophenyl, halogenonitrocyanophenyl, dihalogenocyanophenyl, dihalogenotolyl and dihalogenonitrophenyl, each "halogeno" referring to chloro or bromo, X stands for a member selected from the group consisting of hydrogen, bromine, chlorine and lower alkyl, $n$ and $m$ are integers of 2 through 3, $R_2$ stands for an acyl radical selected from the group consisting of phenoxyacetyl, lower β-alkoxypropionyl, lower γ-alkoxybutyryl and lower β-alkoxyisobutyryl.

2. A water-insoluble monoazo dyestuff which corresponds to the formula

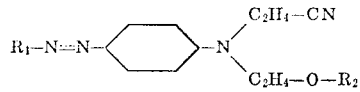

wherein $R_1$ stands for a member of the group consisting of nitrophenyl, chloronitrophenyl, cyanonitrophenyl, and dichloronitrophenyl, $R_2$ stands for an acyl radical selected from the group consisting of phenoxyacetyl, lower β-alkoxypropionyl, lower γ-alkoxybutyryl, and lower β-alkoxyisobutyryl.

3. A water-insoluble monoazo dyestuff of the formula

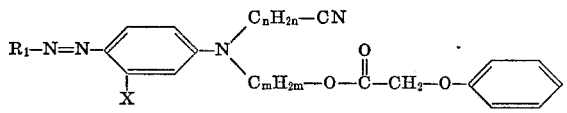

wherein $R_1$ is dicyanophenyl, nitrophenyl, dinitrophenyl, chlorocyanophenyl, bromocyanophenyl, chloronitrophenyl, bromonitrophenyl, cyanonitrophenyl, chlorodinitrophenyl, bromodinitrophenyl, dichloronitrophenyl or dibromonitrophenyl, or, X is hydrogen or lower alkyl, and $m$ and $n$ are integers of 2 through 3.

References Cited

UNITED STATES PATENTS 2,891,942  6/1959  Merian _____ 260—207.1

FLOYD DALE HIGEL, Primary Examiner

U.S. Cl. X.R.

8—4, 41; 106—288; 117—138.8, 144; 260—37, 158

UNITED STATES PATENT OFFICE
CERTIFICATE OF CORRECTION

Patent No. 3,592,807  Dated July 13, 1971

Inventor(s) Hanswilli von Brachel and Otto Grawinger

It is certified that error appears in the above-identified patent and that said Letters Patent are hereby corrected as shown below:

Col. 2, lines 3-7, the formula should read:

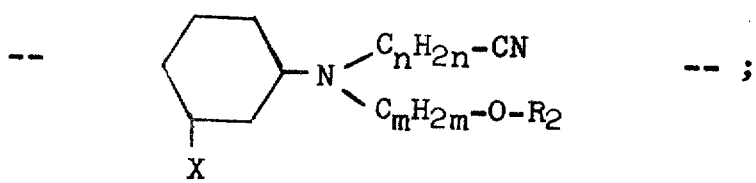

line 33, "9.1" should read -- 0.1 --.

Col. 3, the fortieth "Diazo component" should read -- 2,4-dichloro-5-methyl-aniline --;

the fifty-third "Diazo component" should read --4-cyano-aniline--;

the fifty-third "Coupling component" should read --β-Methoxyisobutyric acid ester of N-cyano-ethyl-N-hydroxyethyl-aniline --.

Signed and sealed this 22nd day of February 1972.

(SEAL)
Attest:

EDWARD M. FLETCHER, JR.
Attesting Officer

ROBERT GOTTSCHALK
Commissioner of Patents

PO-1050
(5/69)

UNITED STATES PATENT OFFICE
CERTIFICATE OF CORRECTION

Patent No. 3,592,807    Dated July 13, 1971

Inventor(s) Hanswilli von Brachel, Dieter Cornelius and Otto Grawinger

It is certified that error appears in the above-identified patent and that said Letters Patent are hereby corrected as shown below:

Col. 2, lines 3-7, the formula should read:

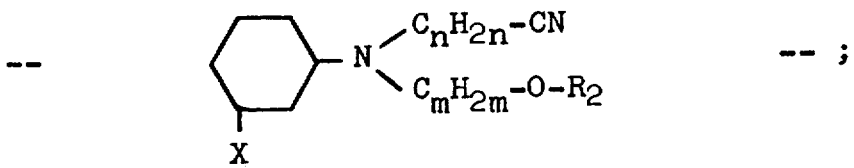

line 33, "9.1" should read -- 0.1.

Col. 3, the fortieth "Diazo component" should read -- 2,4-dichloro-5-methyl-aniline --;

the fifty-third "Diazo component" should read -- 4-cyano-aniline --;

the fifty-third "Coupling component" should read -- $\beta$-Methoxyisobutyric acid ester of N-cyano-ethyl-N-hydroxyethyl-aniline --.

This certificate supersedes Certificate of Correction issued February 22, 1972

Signed and sealed this 27th day of June 1972.

SEAL)
ttest:

DWARD M. FLETCHER, JR.      ROBERT GOTTSCHALK
ttesting Officer            Commissioner of Patents